(12) United States Patent
Troia et al.

(10) Patent No.: US 12,119,990 B2
(45) Date of Patent: *Oct. 15, 2024

(54) DETERMINING WHETHER A VEHICLE SHOULD BE CONFIGURED FOR A DIFFERENT REGION

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 115 days.

This patent is subject to a terminal disclaimer.

(21) Appl. No.: 17/666,110

(22) Filed: Feb. 7, 2022

(65) Prior Publication Data

US 2022/0158898 A1 May 19, 2022

Related U.S. Application Data

(63) Continuation of application No. 15/970,270, filed on May 3, 2018, now Pat. No. 11,245,583.

(51) Int. Cl.
*H04L 41/082* (2022.01)
*B60W 50/04* (2006.01)
*G05D 1/00* (2006.01)
*G06F 8/65* (2018.01)

(52) U.S. Cl.
CPC .......... *H04L 41/082* (2013.01); *B60W 50/045* (2013.01); *G05D 1/0088* (2013.01); *G06F 8/65* (2013.01); *B60W 2050/046* (2013.01)

(58) Field of Classification Search
CPC ....... H04L 41/082; H04L 67/18; H04L 67/34; B60W 50/045; B60W 2050/0071; B60W 2050/0215; B60W 2050/046; G05D 1/0088; G06F 8/65; G06F 9/5061; B60L 3/0061; B60L 3/12; B60L 15/20; B60L 58/10; G06Q 40/08
USPC .................................................. 717/168, 172
See application file for complete search history.

(56) References Cited

U.S. PATENT DOCUMENTS

| 7,506,309 | B2 | 3/2009 | Schaefer | |
| 9,602,606 | B2* | 3/2017 | Wheatley et al. | H04L 67/52 |
| 9,946,531 | B1 | 4/2018 | Fields et al. | |
| 2006/0036735 | A1* | 2/2006 | Gasca et al. | G06F 9/5061 |
| | | | | 709/226 |
| 2011/0321031 | A1* | 12/2011 | Dournov et al. | G06F 8/65 |
| | | | | 717/171 |

(Continued)

FOREIGN PATENT DOCUMENTS

JP 2005-148956 A 6/2005

OTHER PUBLICATIONS

International Search Report and Written Opinion from related international application No. PCT/US2019/024206, dated Jul. 9, 2019, 13 pages.

*Primary Examiner* — Qing Chen
*Assistant Examiner* — Mohammed N Huda
(74) *Attorney, Agent, or Firm* — Brooks, Cameron & Huebsch, PLLC

(57) ABSTRACT

An apparatus can have a processor configured to determine a length of time that a vehicle is in a region and to determine whether the vehicle needs to be configured for the region based on the determined length of time.

20 Claims, 6 Drawing Sheets

(56) References Cited

U.S. PATENT DOCUMENTS

| | | | |
|---|---|---|---|
| 2014/0309864 A1* | 10/2014 | Ricci | G06F 16/25 |
| | | | 701/136 |
| 2016/0013934 A1 | 1/2016 | Smereka et al. | |
| 2016/0147525 A1 | 5/2016 | Choi | |
| 2017/0024201 A1 | 1/2017 | Diedrich et al. | |
| 2017/0331795 A1 | 11/2017 | Martin et al. | |
| 2017/0353350 A1 | 12/2017 | Gussen et al. | |
| 2018/0024826 A1* | 1/2018 | Caushi et al. | G06F 8/65 |
| | | | 717/172 |
| 2018/0136644 A1 | 5/2018 | Levinson et al. | |
| 2019/0250627 A1* | 8/2019 | Witt et al. | G05D 1/0088 |

* cited by examiner

DETERMINING WHETHER A VEHICLE SHOULD BE CONFIGURED FOR A DIFFERENT REGION

PRIORITY INFORMATION

This application is a continuation of U.S. application Ser. No. 15/970,270, filed on May 3, 2018, which will issue as U.S. Pat. No. 11,245,583, on Feb. 8, 2022, the contents of which are incorporated herein by reference.

TECHNICAL FIELD

The present disclosure relates generally to apparatus and methods related to vehicles, and more particularly, to determining whether a vehicle should be configured for a different region.

BACKGROUND

Motor vehicles, such as autonomous vehicles, (e.g., automobiles, cars, trucks, buses, etc.) can include a number of electronic control units (ECUs) coupled to a controller, such as computing device (e.g., an on-board computer). The ECUs can be used to control various subsystems of a vehicle, such as engine subsystems, transmission subsystems, power train subsystems, brake subsystems, camera subsystems, vehicle dashboard subsystems, speed control subsystems, tire pressure monitoring systems, steering control subsystems, obstacle and/or hazard avoidance/recognition subsystems, and the like.

In examples involving autonomous vehicles, the ECUs may interpret inputs from sensors and/or cameras that perceive the surroundings of vehicle so that the vehicle can operate safely. For example, the ECUs can provide speed control and steering control for the vehicle and obstacle and/or hazard avoidance/recognition. As used herein, an autonomous vehicle can be a vehicle in which at least a portion of the decision-making and/or control over vehicle operations is controlled by computer hardware and/or software/firmware, as opposed to a human operator.

The controller and each ECU can include hardware and configuration data, such as software/firmware. For example, the software/firmware can include executable code, software update version data relating to the software/firmware version levels, operating parameters, operation and maintenance manuals, emission settings, engine settings, speed settings, and the like.

DETAILED DESCRIPTION

Embodiments of the present disclosure involve determining whether a vehicle needs to be configured for a region (e.g., for operation in the region), such as a country, based on the length of time the vehicle is in the country. For example, disclosed apparatus and methods can determine the length of time the vehicle has been in a country and can indicate that the vehicle needs software/firmware for the country that configures the vehicle for the country when the vehicle has been in the country for a particular length of time.

Vehicle software/firmware is often specific to the country in which the vehicle is sold. For example, the software/firmware can be based on the language of the country and can include operational parameters, specifications, emission settings, engine settings, speed settings, and the like specific to the country. However, problems can arise when the vehicle is relocated to a new country, making it difficult to service and/or operate the vehicle. For example, the software/firmware may need to be updated so that the vehicle is configured to operate in the new country.

The embodiments of the present disclosure provide improved apparatus, including improved vehicles and improved vehicle components, such as improved vehicle ECUs. For example, the improved apparatus of the present disclosure determine that the vehicle has been relocated to the new country based on the length of time the vehicle is in the country and indicate the vehicle needs software/firmware for the new country in response to determining that the vehicle has been relocated. In this way, the improved apparatus of the present disclosure provides a technical advantage over prior approaches by overcoming the problems associated with relocating the vehicle to a new country and not having the software/firmware for the new country.

Figure 1A:
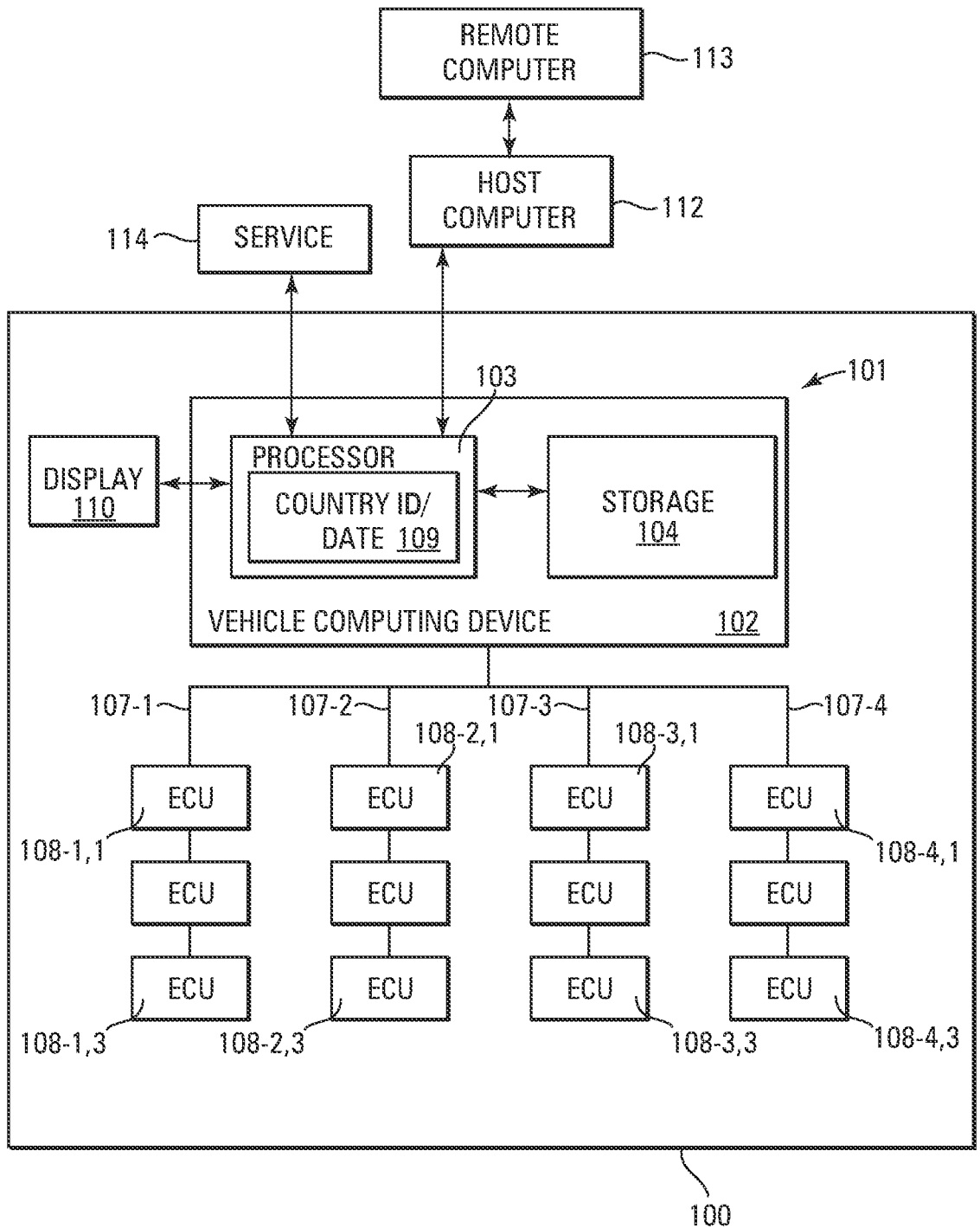
FIG. 1A is a block diagram of an apparatus, such as a vehicle, in accordance with a number of embodiments of the present disclosure.

FIG. 1A is a block diagram of an apparatus, such as a motor vehicle 100 (e.g., an autonomous motor vehicle), in accordance with a number of embodiments of the present disclosure. Vehicle 100 includes a system 101, such as a computer system. System 101 includes a vehicle computing device 102 (e.g., an on-board computer).

Vehicle computing device 102 includes a processor 103 (e.g., a central processing unit (CPU)) coupled to a storage device 104. Storage device 104 can be a non-volatile memory device, such as a NAND flash memory device, a NOR flash memory device, a phase change memory (PCM) memory device, and the like.

Processor 103 can be configured to perform various methods disclosed herein. For example, processor 103 can be configured to: determine a length of time that vehicle 100 is in a region, such as a country, and determine whether vehicle needs to be configured for operation in the country based on the determined length of time. Processor 103 can be configured to indicate that vehicle 100 needs to be configured for operation in the country in response to the length of time being greater than or equal to a threshold length of time. The threshold length of time can be a number of days deemed sufficient for the vehicle 100 to be considered relocated to the country from another country. For example, vehicle 100 may be deemed to be relocated to a country if vehicle 100 will be operating (e.g., consistently) as a vehicle of that country. As such, processor 103 can be configured to determine that vehicle 100 has been relocated to the country in response to the length of time being greater than or equal to a threshold length of time and to indicate that the vehicle needs software/firmware (e.g., needs a software/firmware update) for the country in response to determining that vehicle 100 has been relocated to the country.

In some examples, the software/firmware update can be received (e.g., in response to determining that vehicle 100 needs a software/firmware update) and compared to existing software/firmware installed on vehicle 100. For example, an ID of the software/firmware update, such as a version ID specific to the country, can be compared to an ID of the software/firmware on vehicle 100. The software/firmware update can be installed based on the comparison, such as in response to the IDs not matching. For example, the software/firmware version IDs can be country specific. If vehicle 100 does not have the software/firmware version for the country to which vehicle 100 has be relocated, the software/firmware update can be installed. If vehicle 100 does have the software/firmware version for a country to which vehicle 100 has been relocated, however, the software/firmware update will not be installed. For example, if vehicle 100 remains in its country of origin (e.g., the country for which vehicle 100 is initially configured), the software/firmware version installed on vehicle can match the version of the software/firmware update.

System 101 includes a number of ECUs 108 coupled to vehicle computing device 102. For example, vehicle computing device 102 is coupled to: a bus 107-1, such as a FlexRay Bus, that is coupled to ECUs 108-1,1 to 108-1,3; a bus 107-2, such as a MOST bus, that is coupled to ECUs 108-2,1 to 108-2,3; a bus 107-3, such as a CAN bus, that is coupled to ECUs 108-3,1 to 108-3,3; and a bus 107-4, such as any other suitable bus, that is coupled to ECUs 108-4,1 to 108-4,3. Although the example of FIG. 1A shows three ECUs coupled to each of four buses, there can be any number of ECUs coupled to each of any number of buses.

Processor 103 can include a component, such as country ID/date component 109, configured to obtain a country identifier (ID) of a country in which vehicle 100 is currently located and the current date. For example, the country ID can be an abbreviation of, a complete name of, or a code corresponding to the country. Country ID/date component 109 can receive a message that can include the current country ID and the current date from a global positioning system (GPS) or from a cell of a cellular telephone network in response to vehicle 100 powering up (e.g., being turned on). For example, country ID/date component 109 can include a global positioning device or a cellular positioning device. In some examples, country ID/date component 109 can include a near field communication (NFC) receiver or a radio frequency identification (RFID) receiver that can receive the message from a network of NFC or RFID tags. In some examples, country ID/date component 109 can receive the message via WI-FI.

Vehicle computing device 102 is coupled to a display device 110. Display device 110 can display messages generated by processor 103. Display device 110 can include a touch screen configured to receive touch inputs from a user (e.g., the registered owner) of vehicle 100, such as in response to the messages generated by processor 103. For example, display device 110 might display a message to the user indicating that vehicle 100 needs to be configured for operation in (e.g., needs an update for) the particular country in response to processor 103 determining that vehicle 100 needs to be configured for operation in the particular country.

Processor 103 can be selectively coupled to a host computing device, such as a host computer 112. Host computer 112 may be maintained by a vehicle service provider, for example. Host computer 112 can be selectively coupled to a remote computing device, such as remote computer 113. For example, the remote computing device 113 may be under the control of the manufacturer of vehicle 100 and/or the manufacturer of a vehicle part. Host computer 112 and remote computer 113 can be located at different geographic locations and can be selectively coupled over a wired and/or wireless network, for example.

In some examples, the user may bring vehicle 100 to the vehicle service provider in response to the message to indicating that vehicle 100 needs to be configured for operation in the particular country. The service provider may use host computer 112 obtain an update from remote computer 113 and then use host computer 112 to install the update on vehicle 100 to update vehicle 100 for operation in the particular country.

Alternatively, remote computer 113 may be directly selectively coupled to processor 103 without using host computer 112, such as over a wired and/or wireless network. Remote computer 113 may provide the update to processor 103, such as in response to the user requesting the update via display 110. For example, display 110 may prompt the user to elect to whether to install the update, and processor 103 may send a request to remote computer 113 requesting the update in response to the user electing to receive the update.

The update can include configuration data to configure vehicle 100 for operation in the particular country. The configuration data can be in the form of software/firmware that can include instructions, operating parameters for the particular country, maintenance logs for vehicle 100 in the language of the particular country, operation and maintenance manuals in the language of the particular country, update version levels of the software/firmware, and the like. The operating parameters can include, for example, emission settings, engine settings, speed settings, and the like for the particular country. The instructions can enable and/or disable vehicle functionality according to the rules of the country. For example, a global positioning device may be disabled in countries that prohibit its use. In some examples, processor 103 may store the software/firmware in storage device 104 and/or send the software/firmware to all of ECUs 108.

In some examples, vehicle computing device 102 can be selectively coupled to a service vehicle 114 in the field. For example, service vehicle 114 can be configured to service vehicle 100. In some examples, problems can occur when service vehicle 114 and vehicle 100 are configured to operate in different countries. For example, vehicle 100 may be configured to operate in its country of origin and may have been relocated to a different country in which service vehicle 114 is configured to operate. However, embodiments of the present disclosure solve the problems that can occur when vehicle 100 is relocated to the country in which service vehicle 114 is configured to operate by configuring vehicle 100 to operate in the country in which service vehicle 114 is configured to operate. As such, embodiments of the present disclosure result in technological improvements to processor 103, and thus to vehicle 100.

Figure 1B:
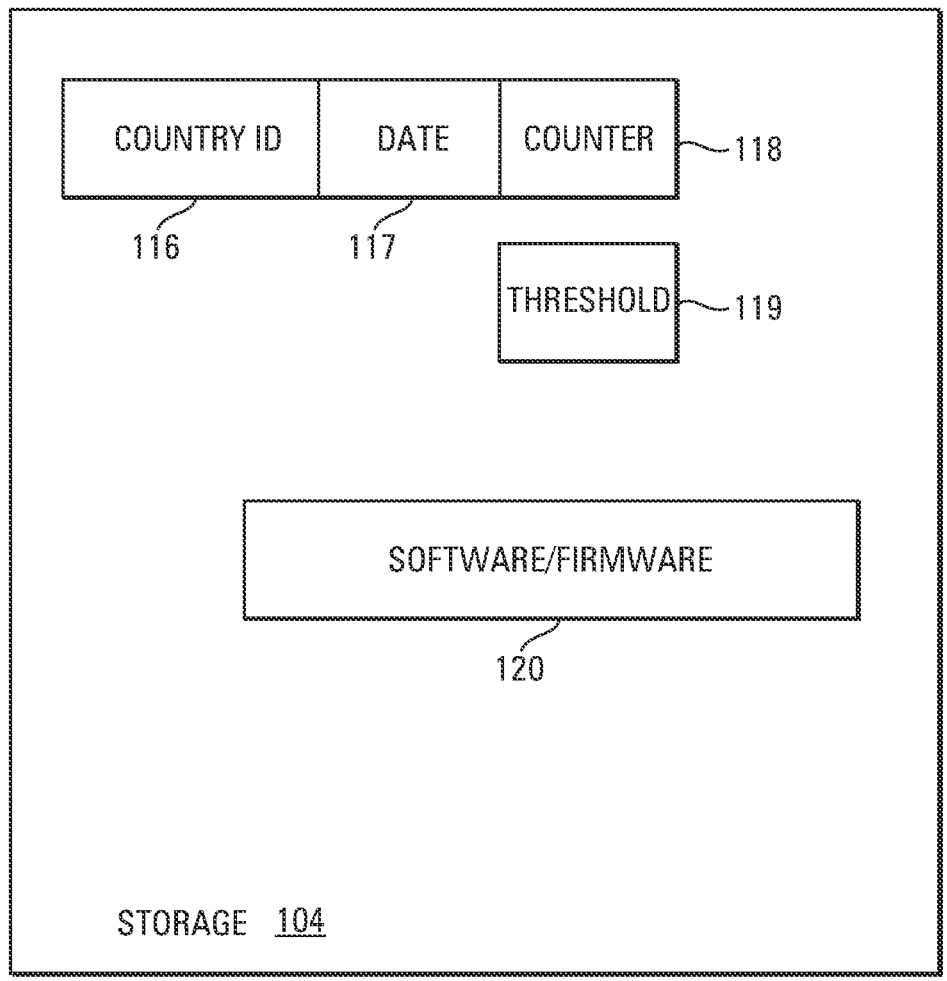
FIG. 1B is a block diagram illustrating a storage device of a vehicle, in accordance with a number of embodiments of the present disclosure.

FIG. 1B is a block diagram illustrating a storage device, such as storage device 104, of a vehicle, such as vehicle 100, in accordance with a number of embodiments of the present disclosure. Storage device 104 is configured to store a country ID of a country in a country ID location (e.g., field) 116. Storage device 104 is configured to store a date in a date field 117.

Storage device 104 is configured to store a value (e.g., a count) of counter 118 having a count corresponding the length of time (e.g., a number of days) vehicle 100 is located in the country indicated by the country ID in country ID field 116. For example, counter 118 keeps track of the number of days vehicle 100 is located in the country. Storage device 104 is configured to store a threshold value corresponding to a threshold length of time, such as a threshold number of days (e.g., a threshold count corresponding to the threshold number of days) in a threshold field 119. Storage device is configured to store configuration data, such as software/firmware 120 that can include software/firmware that configures ECUs 108 and processor 103, and thus vehicle 100, for operation in a specific country and that can be updated in accordance with embodiments of the present disclosure. In some examples, fields 116, 117, and 119 be in non-volatile registers, and counter 118 can be stored in a non-volatile register.

In some examples, the threshold value can be selected by a user. The threshold value can be the number of days (e.g., about 30 days) for which it is deemed that vehicle 100 has been relocated to the country indicated by the country ID in country ID field 116.

Figure 2:
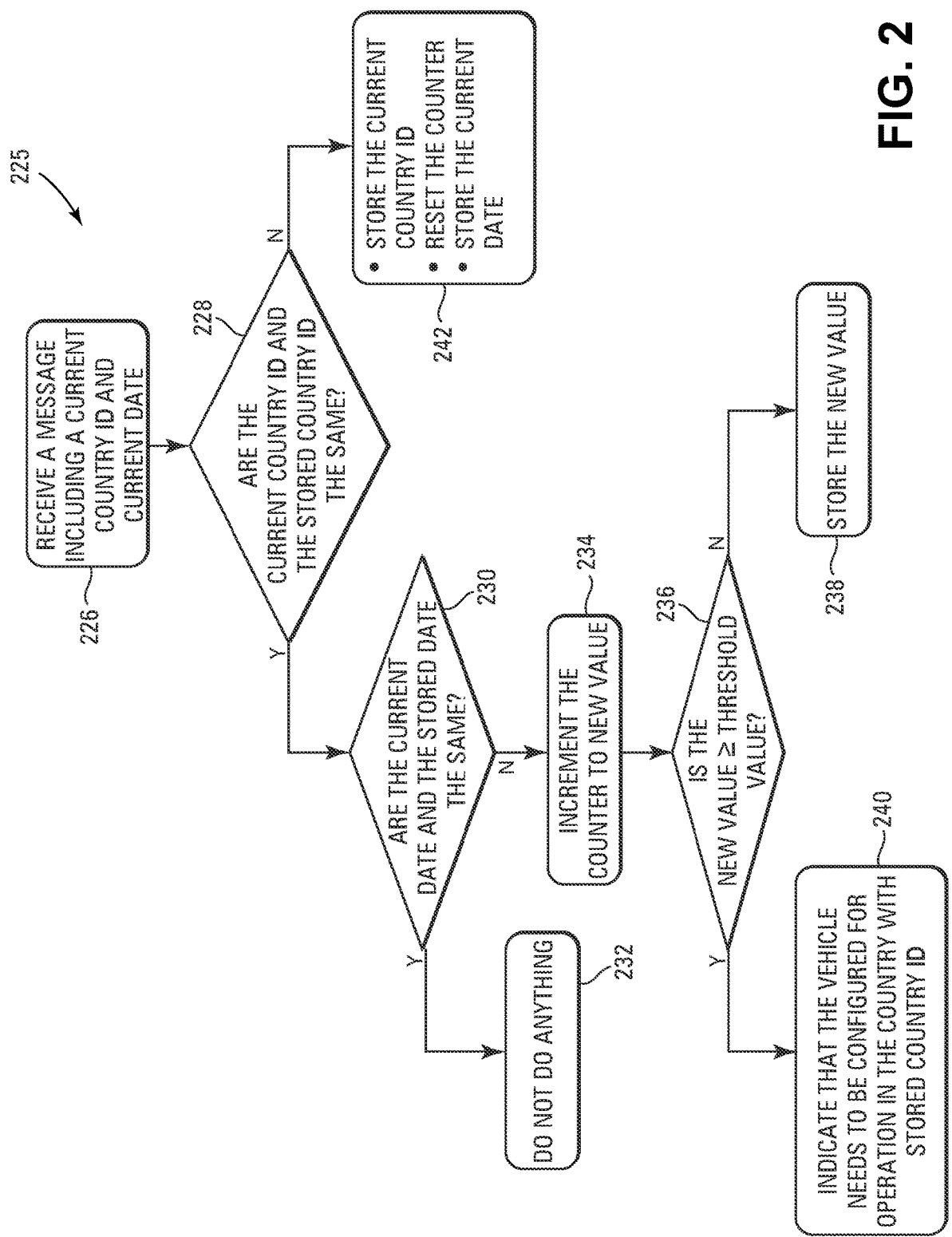
FIG. 2 is a flowchart of a method, in accordance with a number of embodiments of the present disclosure.

FIG. 2 is a flowchart of a method 225 that can be performed by processor 103, in accordance with a number of embodiments of the present disclosure. For example, software/firmware 120 can include instructions corresponding to method 225 that are executable by processor 103. At block 226, in response to vehicle 100 powering up, processor 103 receives a message that includes a current country ID of a country in which vehicle 100 is currently located and a current date. The current country ID is compared, at decision block 228, to the stored country ID in country ID field 116. If the current country ID is the same as the stored country ID at decision block 228, meaning that vehicle 100 has not changed countries since the country ID 116 was last stored, the method proceeds to decision block 230, at which the current date is compared to the stored date in date field 117.

If the current date is the same as the stored date in date field 117 at decision block 230, then the method proceeds to block 232, at which no further action is taken. If, however, the current date is different than the stored date at decision block 230, the method proceeds to block 234, at which processor 103 increments the count of the counter 118 by the number of days that have elapsed (e.g., by the difference in days) between the current date and the stored date to a new value (e.g., a new day count). For example, the new value is the new number of days vehicle 100 is located in the country corresponding to the stored country ID. In some examples, the current date can be compared to the stored date to determine a difference in days between the current date and stored date. The count of the counter 118 can then be incremented by the determined difference. The method then proceeds to decision block 236, at which the new value is compared to a threshold value, such as in threshold field 119. If the new value is less than the threshold value at decision block 236, the method proceeds to block 238, at which counter 118 with the new value is stored in storage device 104 or a non-volatile register.

If the new value is greater than or equal to threshold value at decision block 236, the method proceeds to block 240. Note decision block 236 determines whether the vehicle has been relocated to the country with the stored country ID. If the new value is greater than or equal to threshold value at decision block 236, then the vehicle has been relocated to the country with the stored country ID.

At block 240, the vehicle has been relocated to the country with the stored country ID, and processor 103 indicates that the vehicle needs to be configured for operation in the country with the stored country ID. For example, processor 103 may indicate that the vehicle needs a software/firmware update.

The vehicle can be configured for operation in the country with the software/firmware update corresponding to the country. Processor 103 can indicate the need by causing a message, indicating the need, to be displayed on display 110. A software/firmware update corresponding to the country can be obtained as previously described. For example, the user may bring the vehicle to a service provider that uses host computer 112 to download the software/firmware update from remote computer 113 and to install the software/firmware update. Alternatively, the software/firmware update can be downloaded directly from remote computer 113, such as in response to the user selecting an option on display 110 to download the software/firmware update. Processor 103 may then install the software/firmware update. The software/firmware update can be installed on each of ECUs 108 and/or can update (e.g., replace) at least a portion of the software/firmware 120 such that vehicle 100 is configured for operation in the country with the stored country ID.

As indicated previously, the software/firmware update can have a country-specific version ID that can be compared to the country-specific version ID of the software/firmware installed on vehicle 100. The software/firmware update can be installed if the version IDs do not match, to configure vehicle 100 for operation in the country with the stored country ID. If the version IDs do match, such is in the case where vehicle 100 remains in its country of origin, the software/firmware update will not be installed.

If the current country ID is different than the stored country ID at decision block 228, the method proceeds to block 242. At block 242, the current country ID is stored in country ID field 116, counter 118 is reset (e.g., to zero days) and stored, and the current date is stored in date field 117. For example, the stored country ID in country ID field 116 can be updated to (e.g., replaced by) the current country ID, and the stored date in date field 117 can be updated to the current date.

Figure 3A:
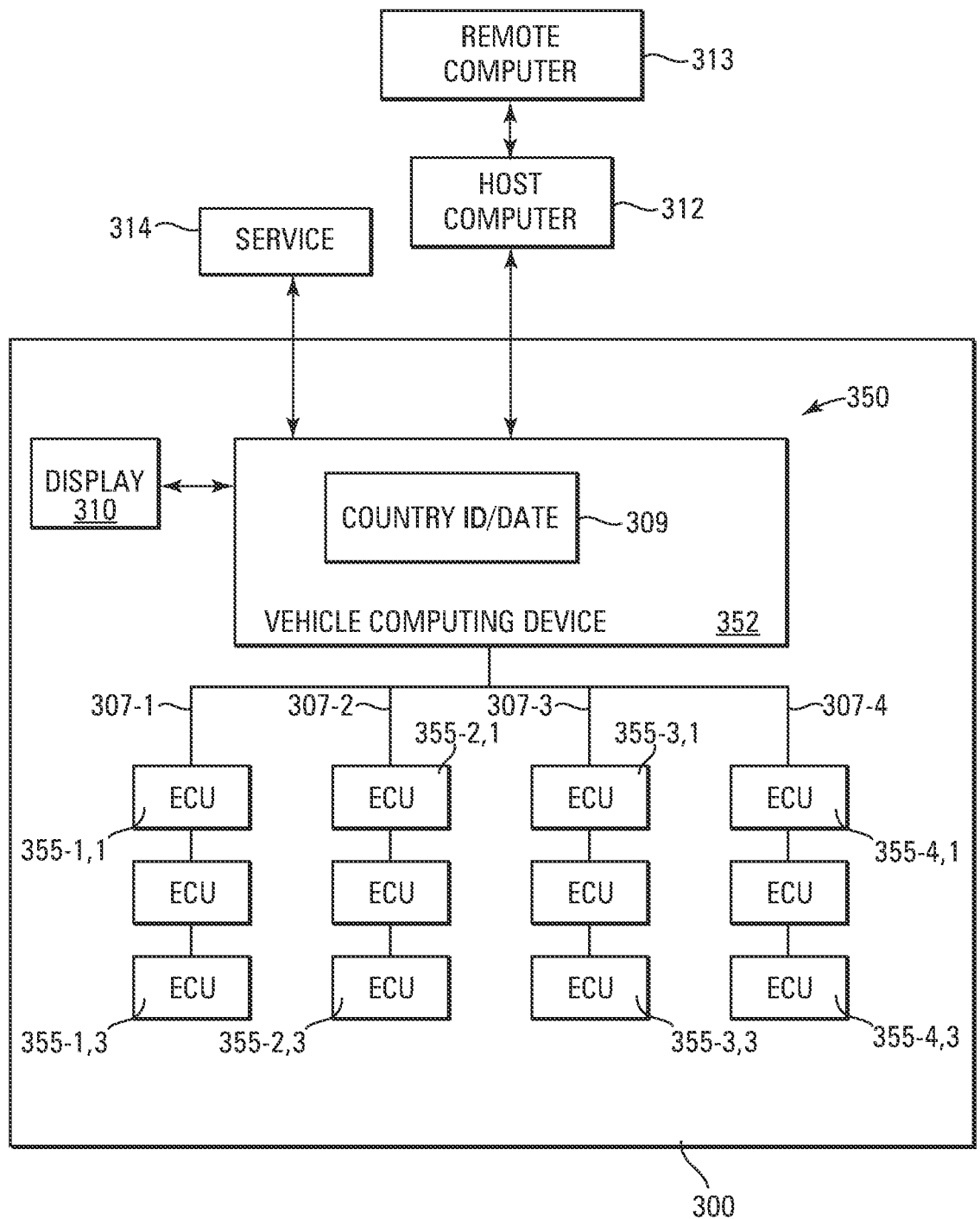
FIG. 3A is a block diagram of an apparatus, such as another vehicle, in accordance with a number of embodiments of the present disclosure.

FIG. 3A is a block diagram of an apparatus, such as a motor vehicle 300 (e.g., an autonomous motor vehicle), in accordance with a number of embodiments of the present disclosure. Motor vehicle 300 includes a system 350, such as a computer system. System 350 includes a vehicle computing device 352 (e.g., an on-board computer), such as a main controller. For example, vehicle computing device 352 can be referred to as a computing device, such as a board computer.

Vehicle computing device 352 is coupled to a display device 310 that can be similar to (e.g., the same as) display device 110. Vehicle computing device 352 can be selectively coupled to a host computer 312 that can be similar to (e.g., the same as) host computer 112. Host computer 312 can be selectively coupled to a remote computer 313 that can be similar to (e.g., the same as) remote computer 313. Vehicle computing device 352 can obtain software/firmware updates from remote computer 313 via host computer 312, such as in a manner described previously in conjunction with FIG. 1A. Alternatively, vehicle computing device 352 can request and receive the software/firmware updates directly remote computer 313, such as in response to a user electing to receive the updates via display device 310, such as in a manner described previously in conjunction with FIG. 1A.

System 350 includes a number of ECUs 355 coupled to vehicle computing device 352. For example, vehicle computing device 352 is coupled to: a bus 307-1, such as a FlexRay Bus, that is coupled to ECUs 355-1,1 to 355-1,3; a bus 307-2, such as a MOST bus, that is coupled to ECUs 355-2,1 to 355-2,3; a bus 307-3, such as a CAN bus, that is coupled to ECUs 355-3,1 to 355-3,3; and a bus 307-4, such as any other suitable bus, that is coupled to ECUs 355-4,1 to 355-4,3. Although the example of FIG. 3A shows three ECUs coupled to each of four buses, there can be any number of ECUs coupled to each of any number of buses.

Processor 303 can include a component, such as country ID/date component 309, configured to obtain a country identifier (ID) of a country in which vehicle 300 is currently located and the current date. For example, country ID/date component 309 can be configured in a manner similar to (e.g., the same as) country ID/date component 109. Country ID/date component 309 can operate in a manner similar to (e.g., the same as) country ID/date component 109, such as previously described in conjunction with FIG. 1A.

Country ID/date component 309 can receive a message that includes a current country ID of a country in which vehicle 300 is currently located and the current date, such as in response to vehicle 300 powering up. Vehicle computing device 352 can send the current country ID and the current date to each of ECUs 355.

Figure 3B:
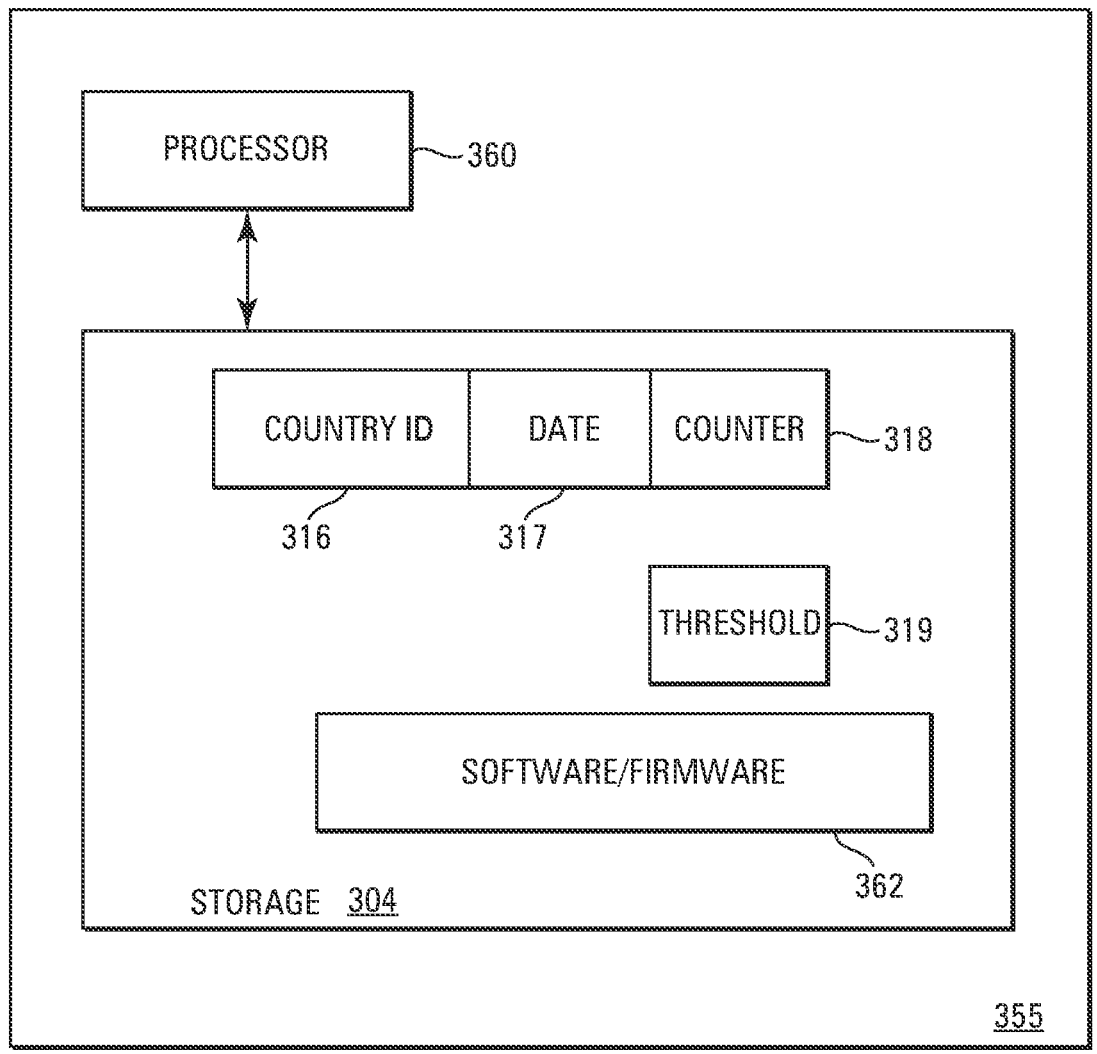
FIG. 3B is a block diagram illustrating an electronic control unit, in accordance with a number of embodiments of the present disclosure.

FIG. 3B is a block diagram illustrating a representative ECU 355, in accordance with a number of embodiments of the present disclosure. For example, each of the ECUs 355 may be configured as shown in FIG. 3B. ECU 355 includes a processor 360 coupled to a storage device 304 that can be similar to (e.g., the same as) storage device 103, such as previously described.

Processor 360 can be configured to perform various methods disclosed herein. For example, processor 360 can be configured to: determine a length of time that vehicle 300 is in a country, and determine whether vehicle 300 (e.g., the respective ECU 355) needs to be configured for operation in the country based on the determined length of time. Processor 360 can be configured to indicate that vehicle 300 needs to be configured for operation in the country in response to the length of time being greater than or equal to a threshold length of time. For example, processor 360 can be configured to determine that vehicle 300 has been relocated to the country in response to the length of time being greater than or equal to the threshold length of time and to indicate that the vehicle needs a software/firmware update for the country in response to determining that vehicle 100 has been relocated to the country.

In some examples, each of the respective processors 360 of each the respective ECUs 355 can determine that the respective ECUs 355 need the software/firmware update concurrently, since the determination can be based on the length of time vehicle 300 is in the country. The respective processors 360 may indicate to vehicle computing device 352 that they need the software/firmware update, and vehicle computing device 352 may obtain the software/firmware update, as previously described. Vehicle computing device 352 may send the software/firmware update to each of the respective processors 360.

In some examples, less than all of the ECUs 355 may need the software/firmware update. For example, each respective processor 360 may be configured to determine whether the software/firmware needs to be updated in response to receiving the software/firmware update. As such, the ECUs 355 can be selectively updated. For example, each respective processor 360 may be configured to compare an ID of the software/firmware update, such as a version level, to an ID of the software/firmware in the respective storage device 304 and to perform the update based on the comparison, such as in response to the IDs matching.

Storage device 304 includes, a country ID field 316, such as described for country ID field 116, a date field 317, such as described for date field 117, a counter 318, such as described for counter 118, and a threshold field 319, such as described for threshold field 119. Storage device 304 is configured to store software/firmware 362 that can include software/firmware that configures the respective ECU 355 for operation in a specific country and that can be updated in accordance with embodiments of the present disclosure.

Processor 360 can receive a software/firmware update and determine whether the software/firmware update should be installed on ECU 355 based on a comparison between a country-specific version ID of the software/firmware update and a country-specific version ID of software/firmware 362. For example, if vehicle 300 is new to the country, the version IDs might not match, and processor 360 may install the software/firmware update. If, however, vehicle 300 is not new to the country (e.g., vehicle is in its country of origin), the version IDs could match, and the software update will not be installed.

Figure 4:
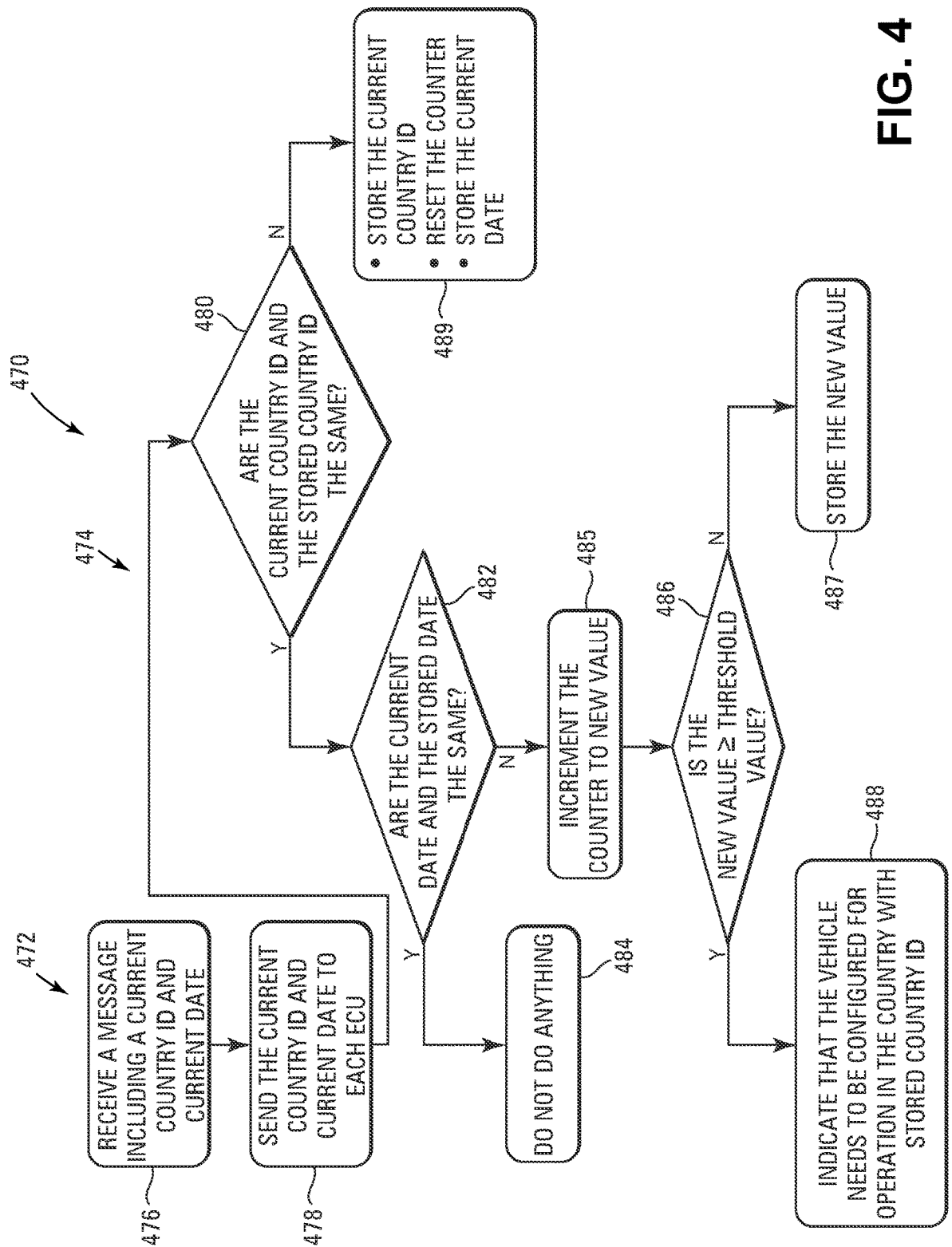
FIG. 4 is a flowchart of a method, in accordance with a number of embodiments of the present disclosure.

FIG. 4 is a flowchart of a method 470, in accordance with a number of embodiments of the present disclosure. In some examples, method 470 can include a number of sub-methods (e.g., subroutines), such as sub-methods 472 and 474. Sub-method 472 can be performed by vehicle computing device 352, and sub-method 474 can be performed by each of the respective processors 360 of each of the respective ECUs 355. For example, software/firmware 362 of the respective processors 360 can include instructions corresponding to sub-method 474 that are executable by the respective processors 360.

At block 476, in response to vehicle 300 powering up, vehicle computing device 352 receives a message that includes a current country ID of a country in which vehicle 300 is currently located and a current date. At block 478, vehicle computing device 352 sends the current country ID and the current date to each of ECUs 355, such as to the respective processors 360 of the respective ECUs.

The current country ID is compared, at decision block 480, to the stored country ID in country ID field 316. If the current country ID is the same as the stored country ID at decision block 480, meaning that vehicle 300 has not changed countries since the stored country ID was last stored, the sub-method 474 proceeds to decision block 482, at which the current date is compared to the stored date in date field 317.

If the current date is the same as the stored date in date field 317 at decision block 482, then the sub-method proceeds to block 484, at which no further action is taken. If, however, the current date is different than the stored date at decision block 482, the sub-method proceeds to block 485, at which the processor 360 increments the count of respective counter 318 by the number of days that have elapsed (e.g., by the difference in days) between the current date and the stored date to a new value. For example, the new value is the new number of days vehicle 300 is located in the country corresponding to the stored country ID. In some examples, the current date can be compared to the stored date to determine a difference in days between the current date and stored date. The count of counter 318 can then be incremented by the determined difference. The sub-method then proceeds to decision block 486, at which the new value is compared to a threshold value in threshold field 319. If the new value is less than the threshold value at decision block 486, the sub-method proceeds to block 487, at which counter 318 with the new value is stored.

If the new value is greater than or equal to the threshold value at decision block 486, the sub-method proceeds to block 488. At block 488, the vehicle has been relocated to the country with the stored country ID, and the respective processor 360 indicates that the vehicle needs to be configured for operation in the country with the stored country ID. For example, the respective processor 360 may indicate that the vehicle needs a software/firmware update. The respective processor can then receive the software/firmware update in response to the determination that the vehicle needs to be configured for operation in the country with the stored country ID. The processor can then determine whether to install the software/firmware update based a comparison between the software/firmware update and software/firmware stored on the respective ECU, as described previously.

Each respective ECU 355 can be configured for operation in the country with the software/firmware update corresponding to the country. Each respective processor 360 can indicate the need to vehicle computing device 352. Vehicle computing device 352 can indicate the need by causing a message, indicating the need, to be displayed on display 310. A software/firmware update corresponding to the country can be obtained as previously described. The software/firmware update can be selectively installed on the respective ECUs 355 determined to need the update, as described previously. For example, the software/firmware update can update (e.g., replace) at least a portion of the software/firmware 362 so that the respective ECUs 355 determined to need the update, and thus vehicle 300, are configured for operation in the country with the stored country ID.

If the current country ID is different than the stored country ID at decision block 480, the sub-method proceeds to block 489. At block 489, the current country ID is stored in each respective country ID field 316, each respective counter 318 is reset (e.g., to zero days) and stored, and the current date is stored in each respective date field 317. For example, the stored country ID in country ID field 316 can be updated to (e.g., replaced by) the current country ID, and the stored date in country ID field 317 can be updated to (e.g., replaced by) the current date.

In the preceding detailed description, reference is made to the accompanying drawings that form a part hereof, and in which is shown, by way of illustration, specific examples. In the drawings, like numerals describe substantially similar components throughout the several views. Other examples may be utilized, and structural, logical and/or electrical changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense.

As used herein, "a number of" something can refer to one or more of such things. A "plurality" of something intends two or more. As used herein, multiple acts being performed concurrently refers to acts overlapping, at least in part, over a particular time period. As used herein, the term "coupled" may include electrically coupled, directly coupled, and/or directly connected with no intervening elements (e.g., by direct physical contact) or indirectly coupled and/or connected with intervening elements. The term coupled may further include two or more elements that co-operate or interact with each other (e.g., as in a cause and effect relationship).

Although specific examples have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

What is claimed is:

1. A system, comprising:
   a vehicle computing device configured to request a software update;
   a hardware component comprising a hardware receiver to obtain a region identifier (ID) representing a region;
   a plurality of processors of a plurality of control units used to control various subsystems of a vehicle, coupled to the hardware component wherein each of the plurality of processors are coupled to each other and the vehicle computing device via a bus and wherein each respective processor of the plurality of processors is configured to:
      determine a length of time that a respective control unit of the plurality of control units of the vehicle is in the region, wherein the length of time is continuous;
      send a request, to the vehicle computing device, for a software update in response to a count being greater than a threshold count and the length of time being greater than or equal to a threshold length of time;
      determine each respective control unit of the plurality of control units that selectively needs to be updated in response to receiving the software update, wherein each respective processor determines whether to update a corresponding control unit from the plurality of control units independently from other processors of the plurality of processors, and wherein each respective processor determines whether to update the corresponding control unit from the plurality of control units when the count is greater than the threshold count;
      update each respective control unit with the software update in response to determining that a portion of the plurality of control units are selectively deemed to need to be updated, wherein the software update includes instructions to disable a function of the vehicle based on a set of rules corresponding to the obtained region identifier;
   a storage device coupled to the plurality of processors and configured to:
      store the received software update;

store the count corresponding to the length of time and to the respective processor of each respective control unit; and store the region identifier corresponding to the region;

wherein each respective processor is configured to:

receive a message having a different region identifier; and in response to the different region identifier being different than the region identifier:

reset the stored count to an initial value; and replace the region identifier with the different region identifier.

2. The system of claim 1, wherein each respective processor is configured to indicate that the respective control unit needs to be configured for the region in response to the length of time being greater than or equal to the threshold length of time.

3. The system of claim 1, wherein the vehicle computing device is configured to prompt a user, to make the request, in response to the length of time being greater than or equal to the threshold length of time.

4. The system of claim 1, wherein each respective processor is configured to determine that the respective control unit needs software/firmware for the region based on the determined length of time.

5. The system of claim 1, wherein:

the storage device is configured to store a threshold count; and each respective processor is configured to compare the count to the threshold count to determine whether the apparatus needs to be configured for the region.

6. The system of claim 1, wherein:

the storage device is configured to store a date and the region identifier corresponding to the region, and each respective processor is configured to increment the stored count in response to receiving the message having the different date than the stored date and having a same region identifier as the stored region identifier.

7. The system of claim 1, wherein each respective processor is configured to determine that the respective control unit is in the region by a global positioning system via the hardware component.

8. The system of claim 1, wherein each respective processor is configured to determine that the respective control unit is in the region by cells of a cellular telephone network via the hardware component.

9. The system of claim 1, wherein each respective processor is configured to determine the length of time that the respective control unit is in the region by counting a number of days the respective control unit is in the region.

10. An apparatus comprising:

a vehicle computing device; and a plurality of control units, used to control various subsystems of a vehicle, coupled to the vehicle computing device, wherein each of the plurality of control units are coupled to each other and the vehicle computing device via a bus and wherein each respective control unit of the plurality of control units comprises:

a respective storage device configured to store a country identifier and a date; and a respective processor coupled to the respective storage device;

wherein the vehicle computing device is configured to:

receive a message comprising a current date and a current country identifier indicating a country in which the vehicle is located on the current date; and send the current date and the current country identifier to each respective control unit, wherein each respective controller from the plurality of control units receives a different instance of the current date and the current country identifier; and wherein each respective processor of the plurality of control units is configured to:

compare the current country identifier to the country identifier stored in the respective storage device;

compare the current date to the date stored in the respective storage device in response to the current country identifier matching the country identifier stored in the respective storage device;

determine a continuous length of time that the vehicle has been located in the current country in response to the current date not matching the date stored in the respective storage device;

send a request, to the vehicle computing device, for a software update in response to a count being greater than a threshold count and the continuous length of time being greater than or equal to a threshold length of time;

receive the software update from the vehicle computing device;

determine each respective control unit of the plurality of control units that selectively needs to be updated in response to receiving the software update, wherein each respective processor determines whether to update a corresponding control unit from the plurality of control units independently from other processors of the plurality of processors, and wherein each respective processor determines whether to update the corresponding control unit from the plurality of control units when the count is greater than the threshold count;

update each respective control unit with the software update in response to determining that a portion of the plurality of control units are selectively deemed to need to be updated, wherein the software update includes instructions to disable a function of the vehicle based on a set of rules corresponding to the current country identifier;

wherein the respective storage device is coupled to the plurality of processors and is configured to:

store the received software update;

store the count corresponding to the continuous length of time and to the respective processor of each respective control unit; and wherein each respective processor is configured to, in response to the current country identifier being different than the country identifier:

reset the stored count to an initial value; and replace the country identifier with the current country identifier.

11. The apparatus of claim 10, wherein:

each respective storage device is configured to store the threshold length of time; and each respective processor is configured to:

indicate to the vehicle computing device that the respective control unit needs to be updated to the current country in response to the continuous length of time being greater than or equal to the threshold length of time.

12. The apparatus of claim 11, wherein the vehicle computing device is configured to indicate to a user that each respective control unit needs to be updated to the current country.

13. The apparatus of claim 11, wherein the vehicle computing device is configured to:
indicate to a remote computing device that each respective control unit needs to be updated to the current country;
receive an update from the remote computing device to update each respective control unit to the current country; and
send the update to each respective control unit.

14. The apparatus of claim 13, wherein each respective processor of each respective control unit is configured to determine whether the respective control unit needs to be updated in response to receiving the update from the vehicle computing device.

15. A method, comprising:
receiving a message, at a vehicle, comprising a current date and a current country identifier indicating a country in which the vehicle is located on the current date;
storing a count corresponding to a continuous length of time;
comparing, using a processor of a control unit from a plurality of control units, used to control various subsystems of the vehicle, the current country identifier to a country identifier stored on the control unit wherein each of a plurality of processors of the plurality of control units are coupled to each other and a vehicle computing device via a bus;
comparing, using the processor, the current date to a date stored on the control unit in response to the current country identifier matching the country identifier stored on the control unit;
determining the continuous length of time that the control unit has been located in the country in response to the current date not matching the date stored on the control unit;
sending a request, to the vehicle computing device, for a software update in response to the count being greater than a threshold and the continuous length of time being greater than or equal to a threshold length of time;
receiving the software update from the vehicle computing device;
determining each respective control unit of the plurality of control units that selectively needs to be updated in response to receiving the software update, wherein each respective processor determines whether to update a corresponding control unit from the plurality of control units independently from other processors of the plurality of processors, and wherein each respective processor determines whether to update the corresponding control unit from the plurality of control units when the count is greater than the threshold count;
updating each respective control unit with the software update in response to determining that a portion of the plurality of control units are selectively deemed to need to be updated, wherein the software update includes instructions to disable a function of the vehicle based on a set of rules corresponding to the current country identifier; and
in response to the current country identifier being different than the country identifier:
resetting the stored count to an initial value; and
replacing the country identifier with the current country identifier.

16. The method of claim 15, further comprising indicating that the control unit needs to be configured for the country in response to the continuous length of time being greater than or equal to the threshold length of time.

17. The method of claim 15, further comprising storing the current country identifier in response to the current country identifier not matching the country identifier stored on the control unit.

18. The method of claim 15, further comprising incrementing a count in response to the current date not matching the date stored on the control unit, wherein the incremented count is the continuous length of time that the control unit has been located in the country.

19. The method of claim 18, further comprising:
comparing the incremented count to a threshold value; and
determining whether the control unit needs to be configured for the country based on the comparison.

20. The method of claim 15, further comprising configuring the control unit for the country in response to the continuous length of time being greater than or equal to the threshold length of time.

* * * * *